(12) United States Patent
Nakamoto et al.

(10) Patent No.: US 8,517,591 B2
(45) Date of Patent: Aug. 27, 2013

(54) LIQUID CRYSTAL DISPLAY DEVICE

(75) Inventors: Hiroshi Nakamoto, Chiba (JP);
Yoshikazu Tanabe, Ichihara (JP); Ken Kagabu, Ichinomiya (JP)

(73) Assignees: Hitachi Displays, Ltd., Chiba (JP);
Panasonic Liquid Crystal Display Co., Ltd., Hyogen-Ken (JP)

( * ) Notice: Subject to any disclaimer, the term of this patent is extended or adjusted under 35 U.S.C. 154(b) by 679 days.

(21) Appl. No.: 12/372,895

(22) Filed: Feb. 18, 2009

(65) Prior Publication Data

US 2009/0213619 A1    Aug. 27, 2009

(30) Foreign Application Priority Data

Feb. 21, 2008   (JP) ................................ 2008-039938

(51) Int. Cl.
*F21V 7/04* (2006.01)

(52) U.S. Cl.
USPC ............ 362/621; 382/617; 382/622; 382/628

(58) Field of Classification Search
USPC .......................... 362/621, 622, 628, 617–619
See application file for complete search history.

(56) References Cited

U.S. PATENT DOCUMENTS

| | | | | |
|---|---|---|---|---|
| 5,711,592 | A * | 1/1998 | Hotta ............................ | 362/496 |
| 6,942,374 | B2 * | 9/2005 | Lee ............................... | 362/615 |
| 7,101,073 | B2 * | 9/2006 | Li ................................. | 362/621 |
| 7,172,328 | B2 * | 2/2007 | Hoelen et al. ................. | 362/610 |
| 7,182,499 | B2 * | 2/2007 | Chen et al. .................... | 362/621 |
| 7,484,875 | B2 * | 2/2009 | Kim et al. ..................... | 362/612 |
| 7,748,862 | B2 * | 7/2010 | Kim ............................... | 362/97.2 |
| 2005/0180167 | A1 * | 8/2005 | Hoelen et al. ................. | 362/613 |
| 2008/0112190 | A1 * | 5/2008 | Liu et al. ....................... | 362/628 |

FOREIGN PATENT DOCUMENTS

| | | |
|---|---|---|
| JP | 2001-341177 | 12/2001 |
| JP | 2004-012747 | 1/2004 |

* cited by examiner

*Primary Examiner* — David J Makiya
(74) *Attorney, Agent, or Firm* — Antonelli, Terry, Stout & Kraus, LLP.

(57) ABSTRACT

In a method of forming a thin light guide plate which includes a compression step in an injection molding step, an optical pattern is liable to be adhered to a mold. Further, in removing the light guide plate from the mold using an ejector pin, a stress is concentrated on a local area of the light guide plate thus generating warping, deformation or irregularities in size of the light guide plate. To overcome such drawbacks, a liquid crystal display device is configured such that an optical pattern portion is compressed, and the light guide plate is removed by making use of a peripheral portion of a mold thus preventing the generation of stress in a local area of the light guide plate due to an ejector pin.

13 Claims, 13 Drawing Sheets

LIQUID CRYSTAL DISPLAY DEVICE

BACKGROUND OF THE INVENTION

1. Field of the Invention

The present invention relates to a light source of a non-self-luminous display device, and more particularly to a liquid crystal display device having a backlight which includes a light guide plate and uses an LED as a light source.

2. Background Art

Recently, the liquid crystal display device has been popularly used as a display device. Particularly, the liquid crystal display device is used as a display part of portable equipment because the liquid crystal display device is thin and light-weighted, and consumes small electric power.

However, the liquid crystal display device is not self-luminous and hence, the liquid crystal display device requires a lighting means. In general, as a lighting device which is used for the liquid crystal display device, a planar lighting device referred to as a backlight is popularly used. Conventionally, although a cold cathode discharge tube has been used as a light emitting element (also referred to as a light source) of the backlight, an LED (light emitting diode) has been also recently used as the light emitting element.

As a thin backlight, there has been known a side-light-type backlight which includes a light emitting element on a side surface thereof. The side-light-type backlight includes a plate-shaped light guide plate. A material of the light guide plate is a light transmitting resin or the like, and light incident on the light guide plate from the light emitting element propagates in the inside of the light guide plate. A reflection/scattering member such as grooves, projections or a printed material is formed on the light guide plate, and the light which propagates in the inside of the light guide plate due to such a reflection/scattering member is directed and radiated toward a liquid-crystal-display-device side.

When LEDs are used as a light emitting element, there arises a drawback that a thickness of the LED becomes larger than a thickness of the light guide plate. Accordingly, in JP-A-2004-12747 (patent document 1), for example, there has been proposed a light guide plate having the constitution in which the light guide plate has a large thickness at a light incident surface on which light is incident from a light source and sets a thickness thereof at a light radiating surface smaller than the thickness of the light guide plate at the light incident surface. Further, in patent document 1, there has been also proposed a light guide plate having the constitution in which a thickness of a light guide plate is set in two stages by forming an inclined surface which extends toward a light radiating surface from a light incident surface. However, patent document 1 neither discloses nor suggests a manufacturing method of the light guide plate whose thickness is further reduced at the light radiating surface.

On the other hand, JP-A-2001-341177 (patent document 2) discloses a technique which forms a light guide plate by compressing a resin at the time of forming the light guide plate by injection molding. However, in the technique disclosed in patent document 2, the whole light guide plate is compressed so that a portion to be compressed is not limited to the light incident portion. Further, patent document 2 neither discloses nor suggests a method of taking out the light guide plate which is suitable for the mass production.

SUMMARY OF THE INVENTION

The further reduction of the thickness of the light guide plate makes the manufacture of the light guide plate by injection molding difficult. Particularly, it is difficult to form the light guide plate by injection molding using the resin within a manufacturing time suitable for mass production and hence, it has been impossible to form a thin light guide plate having stable quality by molding and to take out the light guide plate from a mold.

To overcome the above-mentioned drawbacks, according to one aspect of the present invention, there is provided a liquid crystal display device which includes a display panel, and a backlight which radiates light to the display panel, wherein the backlight includes a light emitting element and a light guide plate on which light from the light emitting element is incident, and the light emitting element is mounted on a side surface of the light guide plate. The light guide plate is formed using a mold. A resin is injected and filled in the mold such that the resin is filled in spaced defined in the mold for forming a light incident portion and a light radiating portion of the light guide plate. Thereafter, the resin filled in the space for forming the light incident portion is compressed by the mold.

A constraining portion is formed on the mold for facilitating the removal of the light guide plate from the mold. A stepped portion which is formed by the constraining portion is formed on a periphery of the light guide plate.

Even when the light radiating portion of the light guide plate is made thin, by injecting and filling a resin into the space formed in the mold corresponding to the light incident portion and, thereafter, by compressing the resin in the space, it is possible to manufacture a thin light guide plate having stable quality in a short time.

The light guide plate is pressed by the constraining portion at the time of removing the light guide plate from the mold and hence, the light guide plate can be easily removed from the mold.

DESCRIPTION OF THE PREFERRED EMBODIMENT

Figure 1:
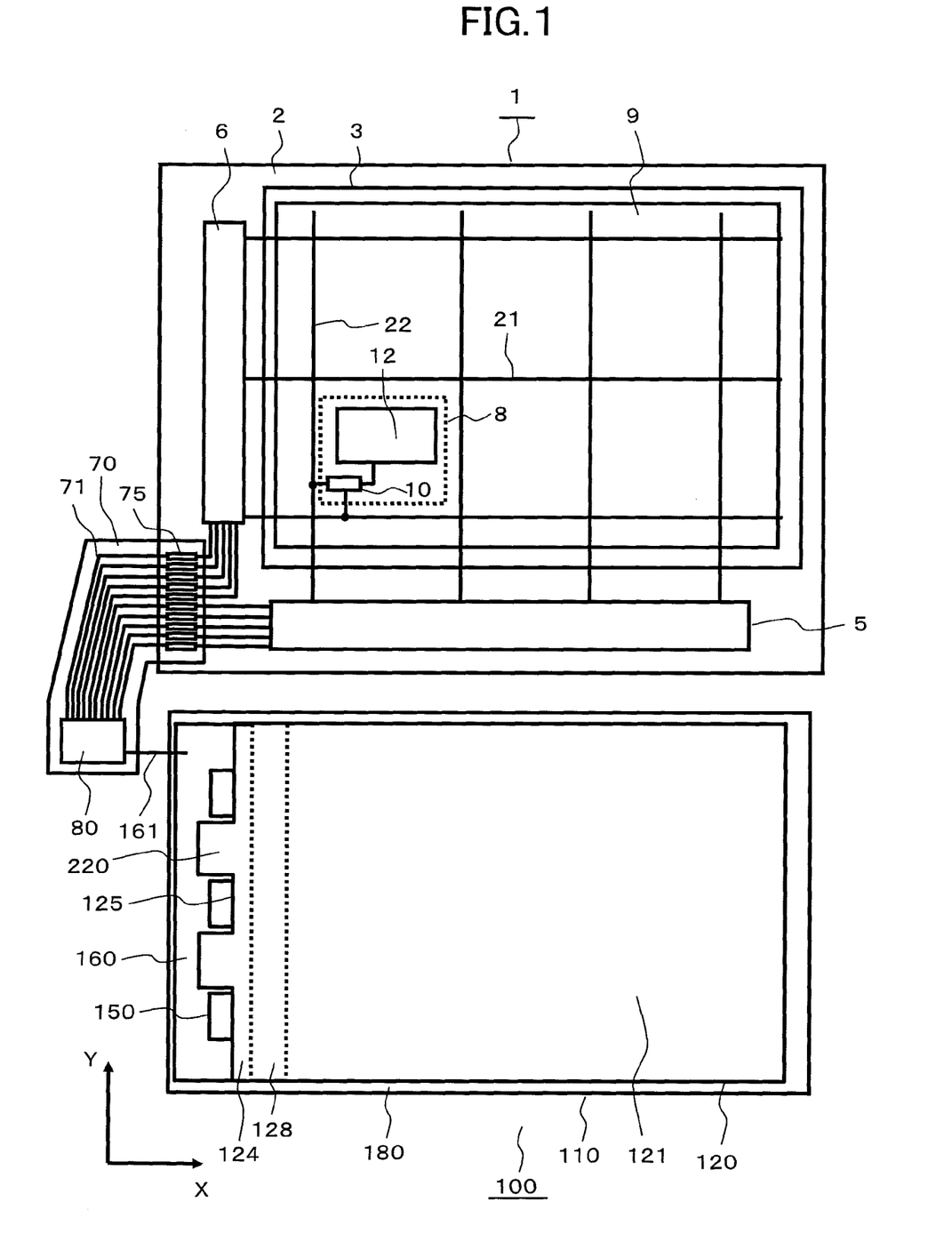
FIG. 1 is a block diagram showing the schematic constitution of a liquid crystal display device of an embodiment according to the present invention.

FIG. 1 is a plan view showing a liquid crystal display device 100 according to the present invention. The liquid crystal display device 100 is constituted of a liquid crystal panel 1, a backlight 110 and a control circuit 80. Signals and power source voltages necessary for a display of the liquid crystal display device 100 are supplied from the control circuit 80. The control circuit 80 is mounted on a flexible printed circuit board 70, and signals are transmitted to the liquid crystal panel 1 via lines 71 and terminals 75.

The backlight 110 is constituted of a light guide plate 120, LEDs 150 and a housing casing 180. The backlight 110 is provided for radiating light to the liquid crystal panel 1. The liquid crystal panel 1 performs a display by controlling a transmission quantity or a reflection quantity of light radiated from the backlight 110. Here, the backlight 110 is mounted on a back-surface side or a front-surface side of the liquid crystal panel 1 in an overlapping manner as viewed from a viewer. However, in FIG. 1, to facilitate the understanding of the constitution of the liquid crystal display device, the backlight 110 is shown in a state that the backlight 110 is arranged parallel to the liquid crystal panel 1.

The light guide plate 120 has a substantially rectangular shape, and the LEDs 150 are arranged on the side surface thereof. Numeral 160 indicates a flexible printed circuit board which electrically connects the plurality of LEDs 150 with each other. The flexible printed circuit board 160 and the control circuit 80 are electrically connected with each other by lines 161.

A side surface 125 on which the LEDs 150 are arranged is referred to as a light incident surface or a light entering surface, and the light is incident on the light guide plate 120 from the light incident surface 125. The light incident on the light guide plate 120 from the light incident surface 125 is radiated from a light radiating portion 121. An inclined portion 128 is formed between the light incident surface 125 and the light radiating portion 121 for guiding the light from the light incident surface 125 to the light radiating portion 121. Further, a light incident portion 124 is formed of the light incident surface 125 and the inclined portion 128, and the light incident portion 124 is provided for efficiently transmitting the light emitted from the LED 150 to the light radiating portion. Here, the light incident portion 124 is explained in detail later.

Next, the liquid crystal panel 1 is explained. The liquid crystal panel 1 includes two substrates consisting of a TFT substrate 2 and a color filter substrate 3 which overlap with each other, and the liquid crystal composition sandwiched between these two substrates. Pixel portions 8 are arranged on the TFT substrate 2, and each pixel portion 8 includes a pixel electrode 12. Here, although the liquid crystal panel 1 includes a large number of pixel portions 8 arranged in a matrix array, to prevent the drawing from becoming complicated, only one pixel portion 8 is shown in FIG. 1. The pixel portions arranged in a matrix array form a display region 9, each pixel portion 8 plays a role of a pixel of a displayed image, and an image is displayed in the display region 9.

In FIG. 1, gate signal lines (also referred to as scanning lines) 21 which extend in the x direction and are arranged parallel to each other in the y direction in the drawing, and drain signal lines (also referred to as video signal lines) 22 which extend in the y direction and are arranged parallel to each other in the x direction in the drawing are provided, wherein the gate signal lines 21 and the drain signal lines 22 intersect with each other. Further, each pixel portion 8 is formed in a region surrounded by the gate signal lines 21 and the drain signal lines 22.

A switching element 10 is provided to the pixel portion 8. A control signal is supplied to the switching element 10 via the gate signal line 21 so as to control an ON/OFF state of the switching element 10. When the switching element 10 is turned on, a video signal transmitted via the drain signal line 22 is supplied to the pixel electrode 12.

The drain signal lines 22 are connected to a drive circuit 5, and the video signals are outputted to the drain signal lines 22 from the drive circuit 5. The gate signal lines 21 are connected to a drive circuit 6, and the control signals are outputted to the gate signal lines 21 from the drive circuit 6. Here, the gate signal lines 21, the drain signal lines 22, the drive circuit 5 and the drive circuit 6 are formed on the same TFT substrate 2. Further, in addition to the drive circuit 5 and the drive circuit 6, the control circuit 80 can be formed on one semiconductor chip.

Figure 2A:
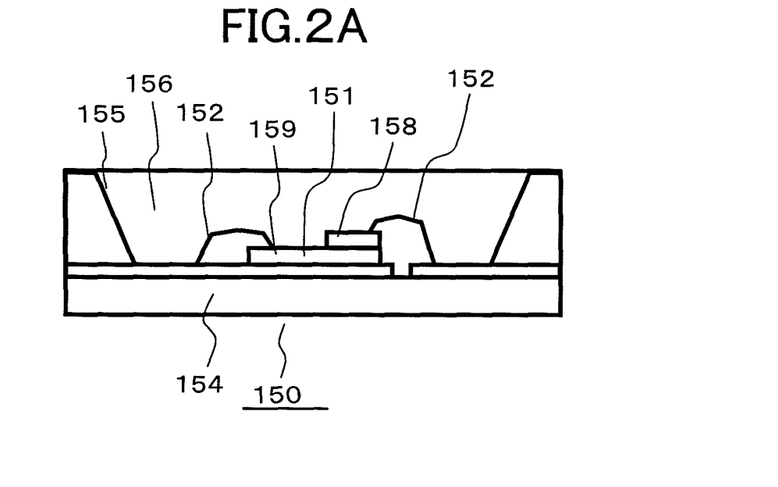
FIG. 2A and FIG. 2B are schematic views showing a light emitting diode of the liquid crystal display device of the embodiment according to the present invention.
Figure 2B:
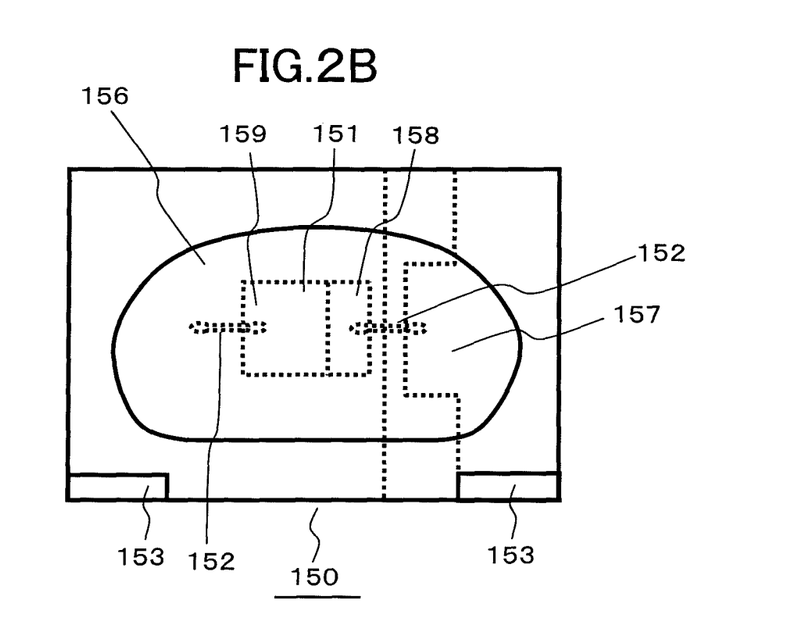

Next, FIG. 2A and FIG. 2B are schematic views showing the LED 150 which constitutes a light emitting element, wherein FIG. 2A is a schematic cross-sectional view of the LED 150, and FIG. 2B is a front view of the LED 150 as viewed from a light-emission side.

The LED 150 is configured such that an LED chip 151 which constitutes a light emission portion is mounted on a chip substrate 154. The LED chip 151 has a pn junction and, when a voltage is applied to the pn junction, the LED chip 151 emits light at a specified wavelength. A p electrode (anode)

158 is formed on a p-type semiconductor layer which forms the pn junction, and an n electrode (cathode) 159 is formed on an n-type semiconductor layer which forms the pn junction.

Wires 152 are respectively connected to the p electrode and the n electrode 159. Chip terminals 153 are provided for connecting the LED 150 to an external portion, and the chip terminals 153 are electrically connected with the p electrode and the n electrode 159 using the wires 152.

A fluorescent light emission part 156 may be arranged on a light radiating portion side of the LED chip 151. The fluorescent light emission part 156 has a function of converting a wavelength of light emitted from the LED chip 151. Numeral 155 indicates a reflection portion, and the reflection portion 155 reflects light toward a front side. A light emission surface from which light is emitted is formed on a front surface side of the LED 150.

Figure 3A:
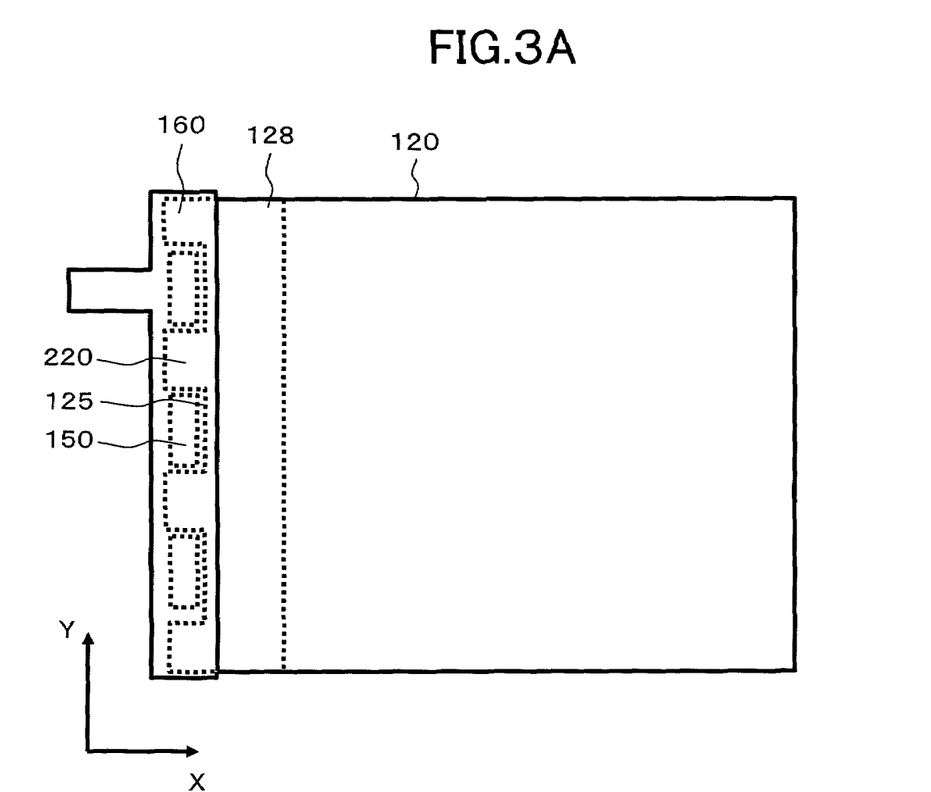
FIG. 3A and FIG. 3B are schematic views showing a light guide plate of the liquid crystal display device of the embodiment according to the present invention.
Figure 3B:
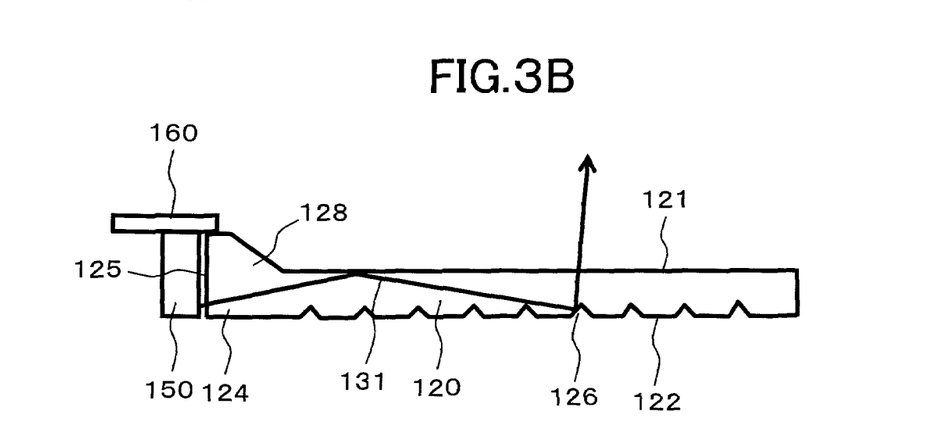

Next, FIG. 3A is a schematic plan view of the light guide plate 120, and FIG. 3B is a schematic side view of the light guide plate 120. As shown in FIG. 3A, the light guide plate is formed into an approximately rectangular shape and, as shown in FIG. 3B, the light guide plate 120 includes an upper surface (also referred to as a light radiating portion) 121 and a lower surface 122. The light guide plate 120 is made of a material such as an acrylic resin or a polycarbonate which allows light to pass therethrough. The light guide plate 120 is formed into a plate shape, and a thickness of the light guide plate 120 is set to 0.1 mm to 11.0 mm.

In FIG. 3B, although a cross section of the light guide plate 120 has an approximately rectangular shape, the inclined portion 128 is formed toward the light radiating portion 121 from the light incident surface 125. The inclined portion 128 is effective when a thickness of the LED 150 is larger than a thickness of the light radiating portion 121 of the light guide plate 120.

In FIG. 3A and FIG. 3B, the positional relationship between the light guide plate 120, the LED 150 and the flexible printed circuit board 160 is shown. On at least one side of the light guide plate 120, the light incident surface 125 is arranged and, in the vicinity of the light incident surface 125, a plurality of LEDs 150 is arranged. The LEDs 150 are arranged below the flexible printed circuit board 160 and along the light incident surface 125.

An adhesive sheet (not shown in the drawing) is arranged on a light-guide-plate-120 side of the flexible printed circuit board 160. By adhering and fixing the flexible printed circuit board 160 to the light guide plate 120, a position of the LED is adjusted with respect to the light incident surface 125. Projecting portions 220 are formed on the light guide plate 120 for ensuring a large adhesive area between the flexible printed circuit board 160 and the light guide plate 120 by way of the adhesive sheet. The projecting portions 220 are formed on a light-incident-surface-125 side of the light guide plate in a state that each LED 150 is sandwiched between the projecting portions 220. By adhering the projecting portions 220 and the flexible printed circuit board 160 to each other, the relative position of the LEDs 150 with respect to the light guide plate 120 can be adjusted with high accuracy.

Next, light 131 emitted from the LED 150 is explained in conjunction with FIG. 3B. The light 131 emitted from the LED 150 is incident on the light guide plate 120 from the light incident surface 125. A refractive index of the light guide plate 120 is larger than a refractive index of air and hence, light which reaches the light incident surface 125 at an angle larger than a specified angle with respect to the direction perpendicular to the light incident surface 125 is reflected on the light incident surface 125, while light which reaches the light incident surface 125 at an angle smaller than the specified angle with respect to the direction perpendicular to the light incident surface 125 enters the inside of the light guide plate 120.

The upper surface 121 and the lower surface 122 of the light guide plate 120 are arranged to be substantially orthogonal to the light incident surface 125, and the light which enters the inside of the light guide plate 120 advances in the inside of the light guide plate 120 while repeating the total reflection between the upper surface 121 and the lower surface 122 of the light guide plate 120. Grooves 126 having a V-shaped cross section are formed in the lower surface 122 as reflection portions. A part of the light which advances through the light guide plate 120 is reflected toward the upper-surface-121 side on the grooves 126 formed in the lower surface 122, and is radiated from the upper surface 121. Here, the explanation is made with respect to a case in which the reflection portion is formed of the grooves 126 having a V-shaped cross section as one example. However, any reflection portion may be used provided that the reflection portion has a function of directing the light which advances in the inside of the light guide plate toward the upper-surface-121 side. For example, white dots formed by printing or the like may be used as the reflection portions.

Figure 4A:
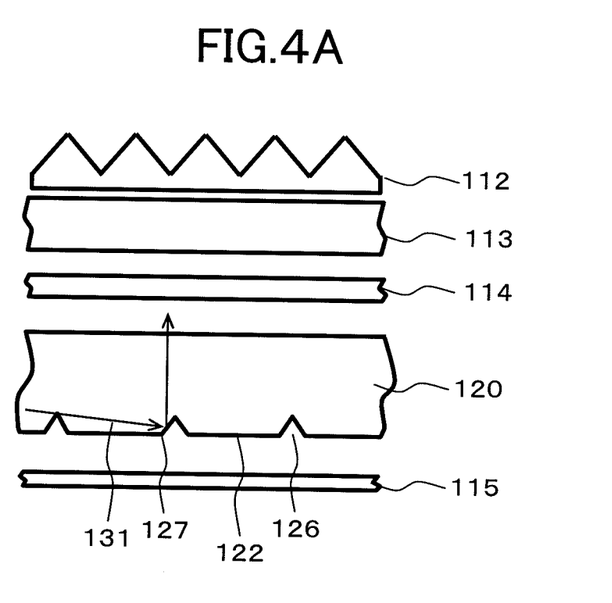
FIG. 4A and FIG. 4B are schematic cross-sectional views showing the light guide plate of the liquid crystal display device of the embodiment according to the present invention.
Figure 4B:
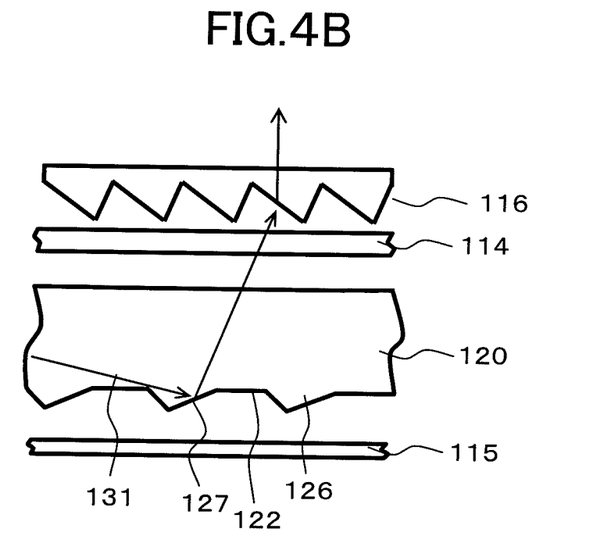

Next, the light which is reflected on the grooves 126 is explained in conjunction with FIG. 4A and FIG. 4B. FIG. 4A shows a case in which the grooves 126 are recessed inwardly, while FIG. 4B shows a case in which the grooves 126 project outwardly. Each groove 126 includes a reflection surface (also referred to as an inclined surface) 127, wherein the reflection surface 127 makes an angle of 1 to 35 degrees with respect to the lower surface 122. The light which is reflected on the reflection surface 127 is reflected toward the upper surface of the light guide plate 120. By reflecting the light on the reflection surface 127, it is possible to set an angle of light with respect to the upper surface 121 to an angle which allows the light to be radiated from the upper surface 121. That is, although the light repeats the total reflection in the inside of the light guide plate 120 as described above, due to the formation of the reflection surfaces 127, the angle of the light with respect to the upper surface 121 becomes an angle which allows the radiation of light from the light guide plate 120, and the light is radiated from the light guide plate 120.

As shown in FIG. 4A, prism sheets 112, 113 are arranged on the upper surface 121 of the light guide plate 120 so as to control the direction of light radiated from the light guide plate 120. Here, in FIG. 4A, the prism sheets 112, 113 are arranged in a state that ridges of triangular columns of the prism sheet 112 and ridges of triangular columns of the prism sheet 113 intersect with each other. Accordingly, the prism sheet 113 can refract the advancing direction of light which is radiated from the light guide plate 120 in the lateral direction thus directing the light toward the inside (liquid-crystal-panel side). Here, numeral 114 indicates a diffusion plate, and numeral 115 indicates a reflection sheet.

Next, FIG. 4B shows a case in which one sheet of asymmetric prism sheet is used. The light which is reflected on the reflection surface 127 makes an obtuse angle with respect to the perpendicular direction of the upper surface 121, and the light is radiated from the upper surface 121 such that the light expands outwardly (toward a right side in the drawing). On the light guide plate 120, an asymmetrical prism sheet 116 is formed so as to refract the outgoing light toward a liquid-crystal-panel (not shown in the drawing) side.

Figure 5:
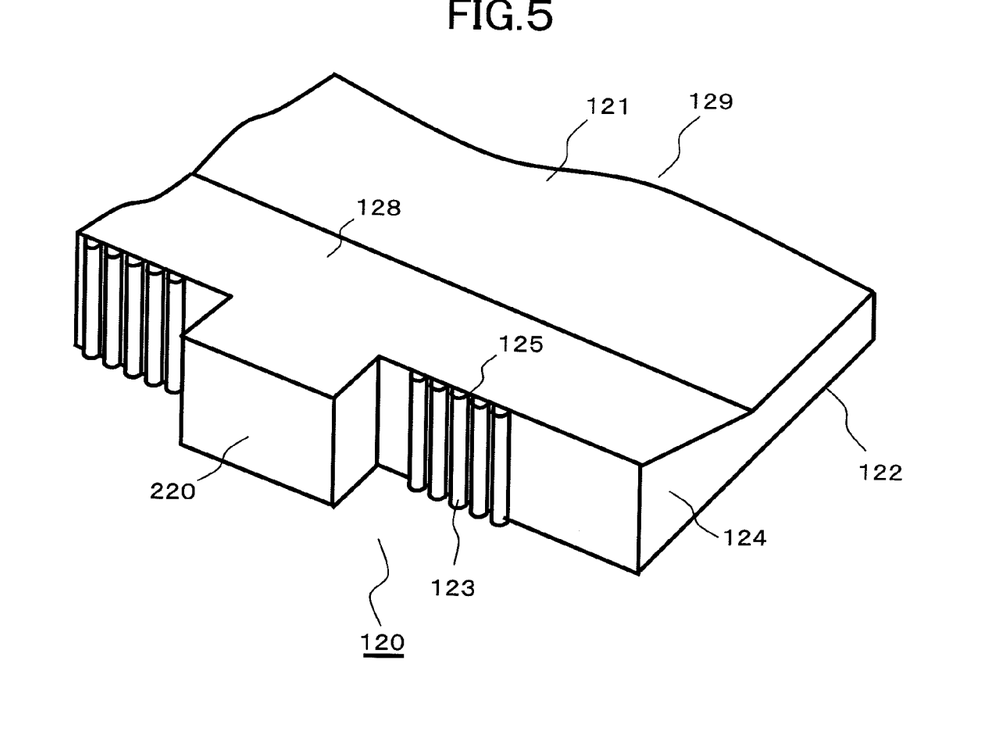
FIG. 5 is a schematic cross-sectional view showing an area in the vicinity of a light incident surface of the light guide plate of the liquid crystal display device of the embodiment according to the present invention.

FIG. 5 is a perspective view showing the vicinity of the light incident surface 125 of the light guide plate 120. Lenses 123 are formed on the light incident surface 125 of the light guide plate 120. The lenses 123 have a function of scattering light incident from the light incident surface 125. The light incident from the light incident surface 125 is guided to the light radiating portion 121 by way of the inclined portion 128. A projecting portion 220 is formed between the neighboring lenses 123 in a state that the projecting portion 220 projects from the light incident surface 125. The light incident portion 124 is formed of the projecting portions 220, the light incident surface 125, the lenses 123, the inclined portion 128 and the like.

When the light guide plate 120 is made thin, a thickness of the LED 150 becomes larger than a thickness of the light guide plate 120 defined between the upper surface 121 and the lower surface 122. Accordingly, a thickness of the light guide plate 120 at the light incident surface 125 is set large so as to form the inclined portion 128 thus guiding the light toward the upper-surface-121 side.

The light is radiated toward a liquid-crystal-panel side from the upper surface 121. A portion of the light guide plate 120 from which the light is radiated toward the liquid crystal panel is referred to as a light radiating portion 129. To satisfy a demand for further reduction of a thickness of the light guide plate 120, a thickness of the light guide plate 120 at the light radiating portion 129 is steadily reduced. However, when a distance between the upper surface 121 and the lower surface becomes 1 mm or less, it becomes difficult to manufacture the light guide plate 120 by injection molding.

For realizing the reduction of thickness of the light guide plate 120, a means which realizes thin-plate molding by forming a resin plate having a thickness equal to or more than a thickness of the light guide plate 120 by molding and by compressing the resin plate in a mold may be effective. However, when a plate thickness of the thin wall portion becomes 0.4 mm or less, a drawback that a resin is cooled and solidified rapidly arises conspicuously. In this case, even when the resin is compressed after being filled in the mold, the light guide plate having a desired shape cannot be formed by molding and hence, the transfer of a shape of the mold for forming the light incident portion 124 to the light incident portion 124 of the formed light guide plate 120 becomes unstable. Accordingly, it is necessary to cope with such a drawback.

On the other hand, when the compression is not used, there arises a following drawback. That is, the light incident portion 124 has fine portions and hence, it is necessary to accurately transfer a shape of the mold to the light incident portion 124. When the thickness of the light radiating portion is small, with respect to a resin which reaches the light incident portion 124 after passing the light radiating portion at the time of performing injection molding, since a thickness of the light incident portion 124 is larger than a thickness of the light radiating portion 129, a pressure which pushes the resin is decreased in the light incident portion so that the resin is not sufficiently filled in the mold under pressure.

In view of the above, according to the present invention, a resin is injected and filled in spaces defined in the mold for forming the light radiating portion 129 and the light incident portion 124 and, thereafter, the resin filled in the space in the mold corresponding to the light incident portion is compressed thus allowing a shape of the mold to be transferred to the light incident portion 124 sufficiently.

Figure 6:
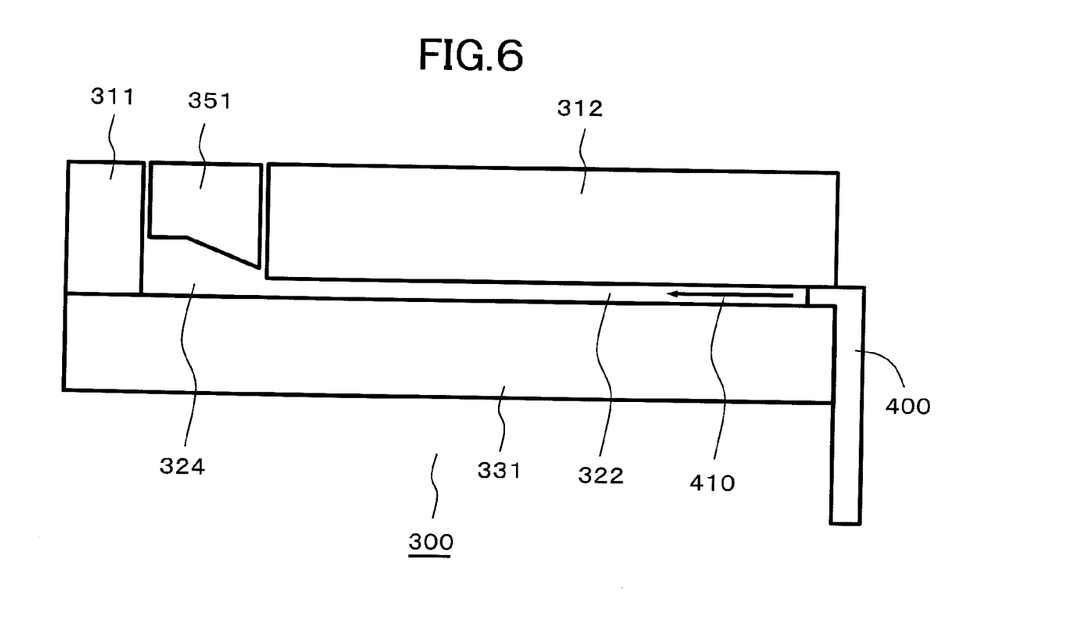
FIG. 6 is a schematic cross-sectional view showing a mold for forming the light guide plate of the liquid crystal display device of the embodiment according to the present invention.

FIG. 6 is a schematic cross-sectional view of the mold. The mold 300 is constituted of a first side-surface portion 311, an upper surface portion 312 and a lower surface portion 331. The light guide plate is formed by injecting resin into a gap surrounded by the first side-surface portion 311, the upper surface portion 312 and the lower surface portion 331. Here, FIG. 6 to FIG. 8 and FIG. 12 are cross-sectional views of the mold taken along the long-side direction (x direction in FIG. 3) of the light guide plate 120.

A resin is injected into the mold 300 in the direction indicated by an arrow 410 from an opening portion which is referred to as a sprue or a gate 400. Due to the pressure which is applied from the outside, the resin is filled in the inside of the mold 300. First of all, the resin which enters the mold from the gate 400 is firstly filled in a light-radiating-portion forming space 322 and, thereafter, reaches a light-incident-portion forming space 324.

Figure 7:
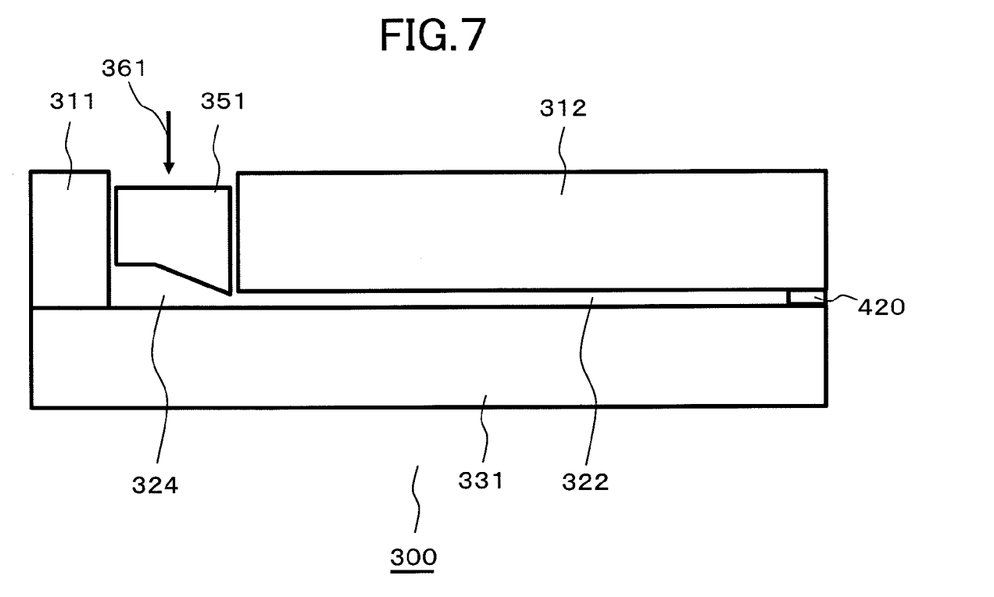
FIG. 7 is a schematic cross-sectional view showing the mold for compression-forming the light guide plate of the liquid crystal display device of the embodiment according to the present invention.

In the light-incident-portion forming space 324, a compression portion 351 is formed. As shown in FIG. 7, after the light-incident-portion forming space 324 is filled with the resin, the compression portion 351 is lowered in the direction indicated by an arrow 361 thus compressing the resin. By compressing the resin by the compression portion 351, the configuration of the lenses 123 or the like is accurately transferred to the light incident portion 124. Here, a plug 420 is arranged in the gate 400 so as to prevent the leaking of the resin from the gate 400.

Figure 8:
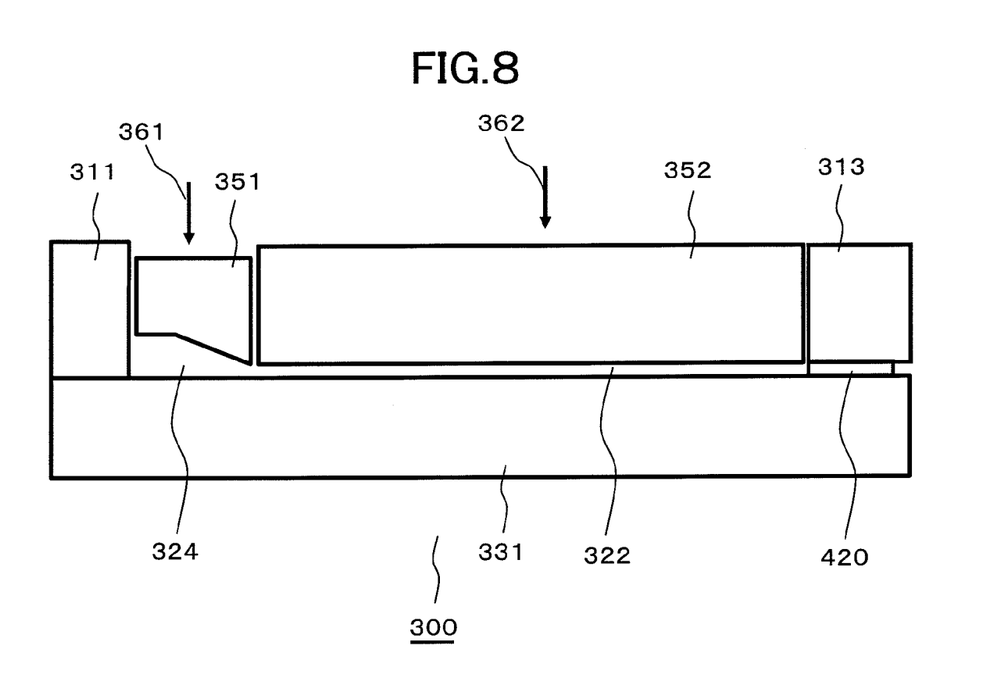
FIG. 8 is a schematic cross-sectional view showing the mold for compression-forming the light guide plate of the liquid crystal display device of the embodiment according to the present invention.

Next, FIG. 8 shows a case in which not only the light incident portion 124 but also the light radiating portion 129 are compressed. In a light-radiating-portion forming space 322, a second compression portion 352 is formed, and the second compression portion 352 can compress the resin in the direction indicated by an arrow 362 after the resin is filled in the light-radiating-portion forming space 322.

Figure 9:
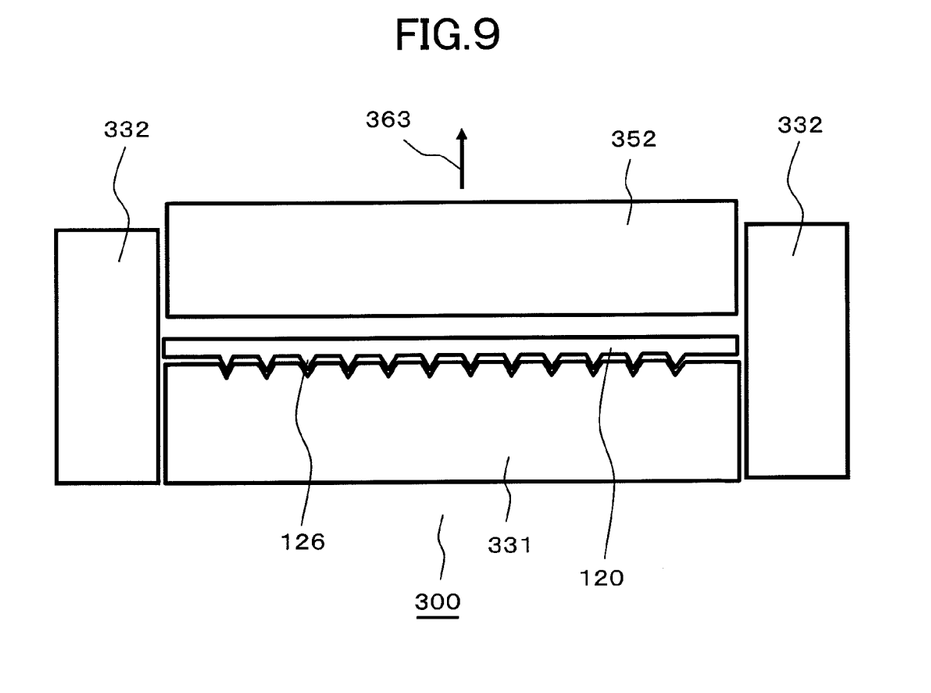
FIG. 9 is a schematic cross-sectional view showing the mold for compression-forming the light guide plate of the liquid crystal display device of the embodiment according to the present invention.

A second side-surface portion 313 is formed so as to surround the second compression portion 352, and the second compression portion 352 is movably held by a second side-surface portion 313 and a third side-surface portion 332 shown in FIG. 9.

After compressing the light incident portion 124 and the light radiating portion 129, as shown in FIG. 9, the second compression portion 352 is moved in the direction indicated by an arrow 363, and the compression operation is finished. Here, there arises a drawback that grooves 126 formed on the light radiating portion 129 are adhered to the lower surface portion 331 of the mold thus making the removal of the light guide plate 120 from the mold difficult. FIG. 9 to FIG. 11 and FIG. 13 are cross-sectional views of the mold taken along the short-side direction (y direction in FIG. 3) of the light guide plate 120.

When a thickness of the light radiating portion 129 is set to 0.4 mm or less, such a thickness is close to a resin-made-product forming thickness limit and hence, the light guide plate 120 cannot be surely formed. Accordingly, by filling the resin in the mold 300 such that a thickness of the resin is set to a desired thickness or more and, thereafter, by compressing the resin, the light guide plate 120 having a small thickness can be realized. In this case, however, there arises a drawback that the resin is adhered to an optical pattern such as the grooves 126 and hence, it is difficult to remove the light guide plate 120 from the mold 300.

In an attempt to remove the light guide plate 120 from the mold 300 forcibly, the manufactured light guide plate 120 having a thickness of 0.4 mm or less exhibits deformation or irregularities in size thus lowering manufacturing efficiency. That is, although the method which compresses the resin is adopted for forming the thin light guide plate 120 having a thickness of 0.4 mm or less, such a compression method exhibits the drawback that it is difficult to remove the light guide plate 120 from the mold 300 due to a small thickness of the light guide plate 120.

Figure 10:
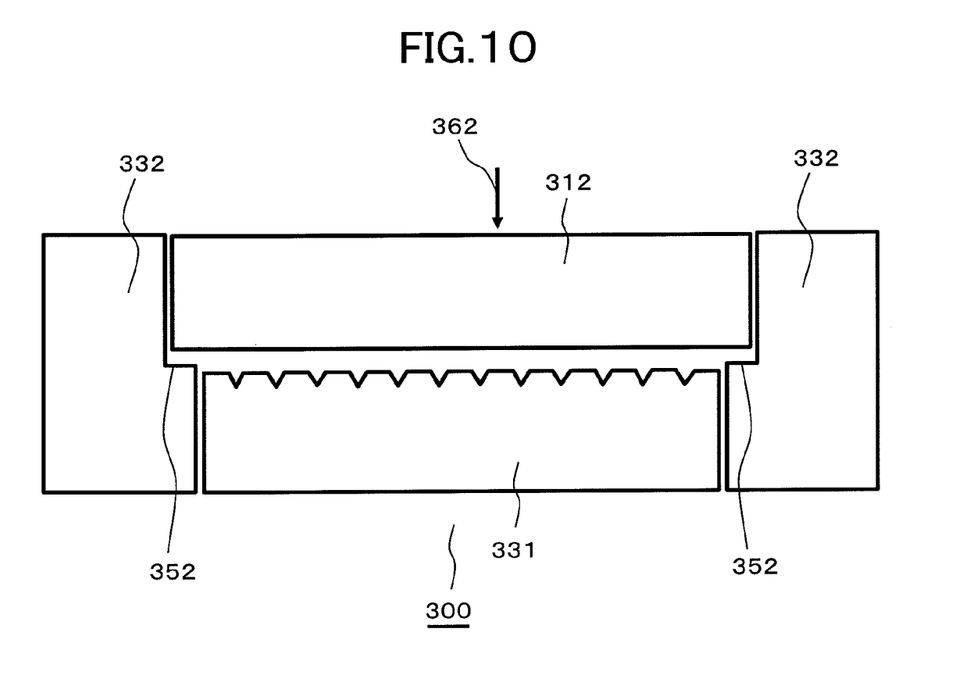
FIG. 10 is a schematic cross-sectional view showing the mold for compression-forming the light guide plate of the liquid crystal display device of the embodiment according to the present invention.
Figure 11:
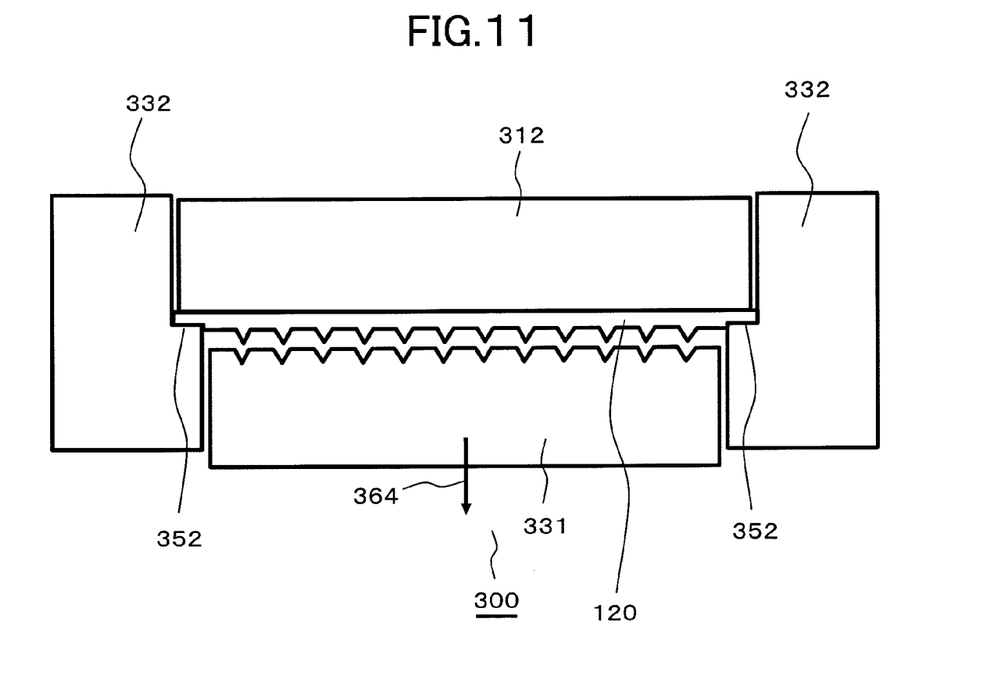
FIG. 11 is a schematic cross-sectional view showing the mold for compression-forming the light guide plate of the liquid crystal display device of the embodiment according to the present invention.

In view of the above, as shown in FIG. 10, a constraining portion 352 is formed around the optical pattern such as grooves 126. In FIG. 10, the constraining portion 352 is formed on the third side-surface portion 332. As shown in FIG. 11, the constraining portion 352 prevents, when the lower surface portion 331 of the mold is moved in the direction indicated by an arrow 364, the light guide plate 120 from moving in the direction indicated by an arrow 364 thus allowing the lower surface portion 331 of the mold to be easily removed from the light guide plate 120.

Figure 12:
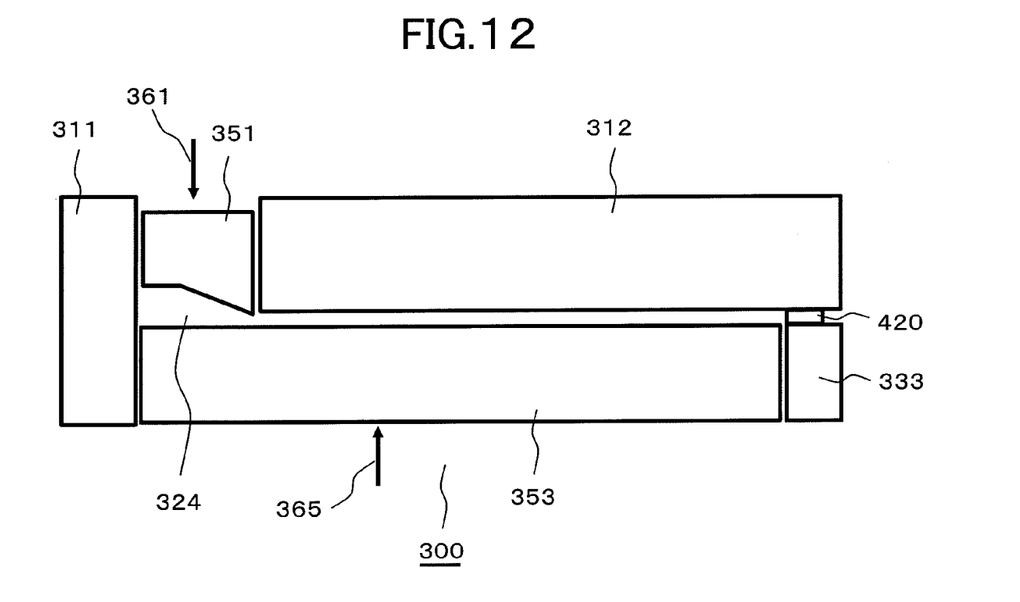
FIG. 12 is a schematic cross-sectional view showing the mold for compression-forming the light guide plate of the liquid crystal display device of the embodiment according to the present invention.
Figure 13:
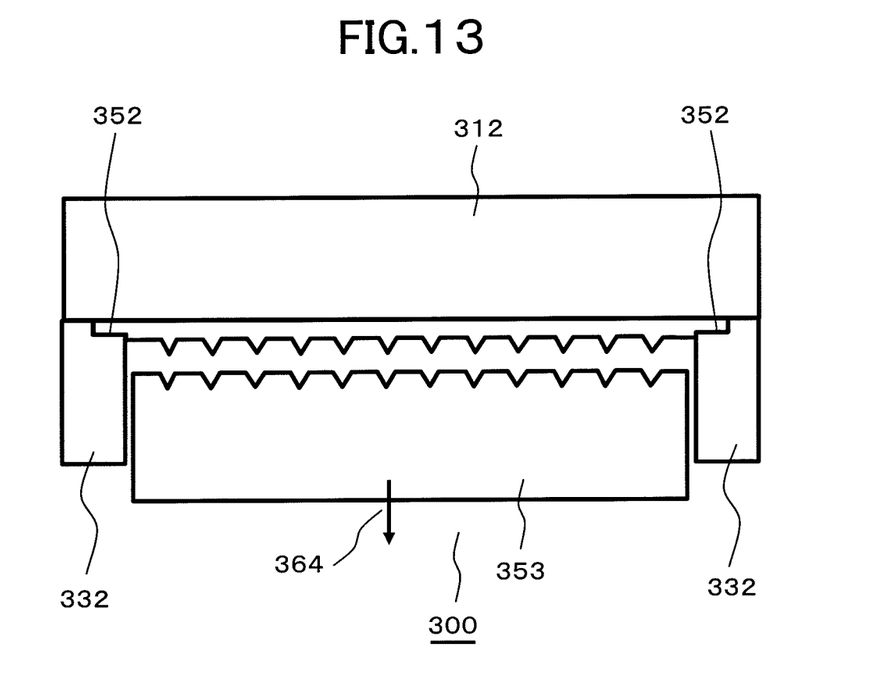
FIG. 13 is a schematic cross-sectional view showing the mold for compression-forming the light guide plate of the liquid crystal display device of the embodiment according to the present invention.

Next, FIG. 12 and FIG. 13 show a case in which the light guide plate 120 is compressed by the compression portion 351 from above and is also compressed by the compression portion 353 from below. In the light-incident-portion forming space 324, the compression portion 351 is moved in the direction indicated by an arrow 361 thus compressing the light incident portion 124, and the light guide plate 120 is also compressed in the direction indicated by an arrow 365 by the compression portion 353 from below.

With the provision of the compression portion 353, the compression portion 353 is moved in the direction indicated by an arrow 364 in FIG. 13 after compressing the light guide plate 120 so that the compression portion 353 is peeled off from the light guide plate 120. Also in FIG. 13, the constraining portion 352 is formed on the third side-surface portion 332.

Figure 14:
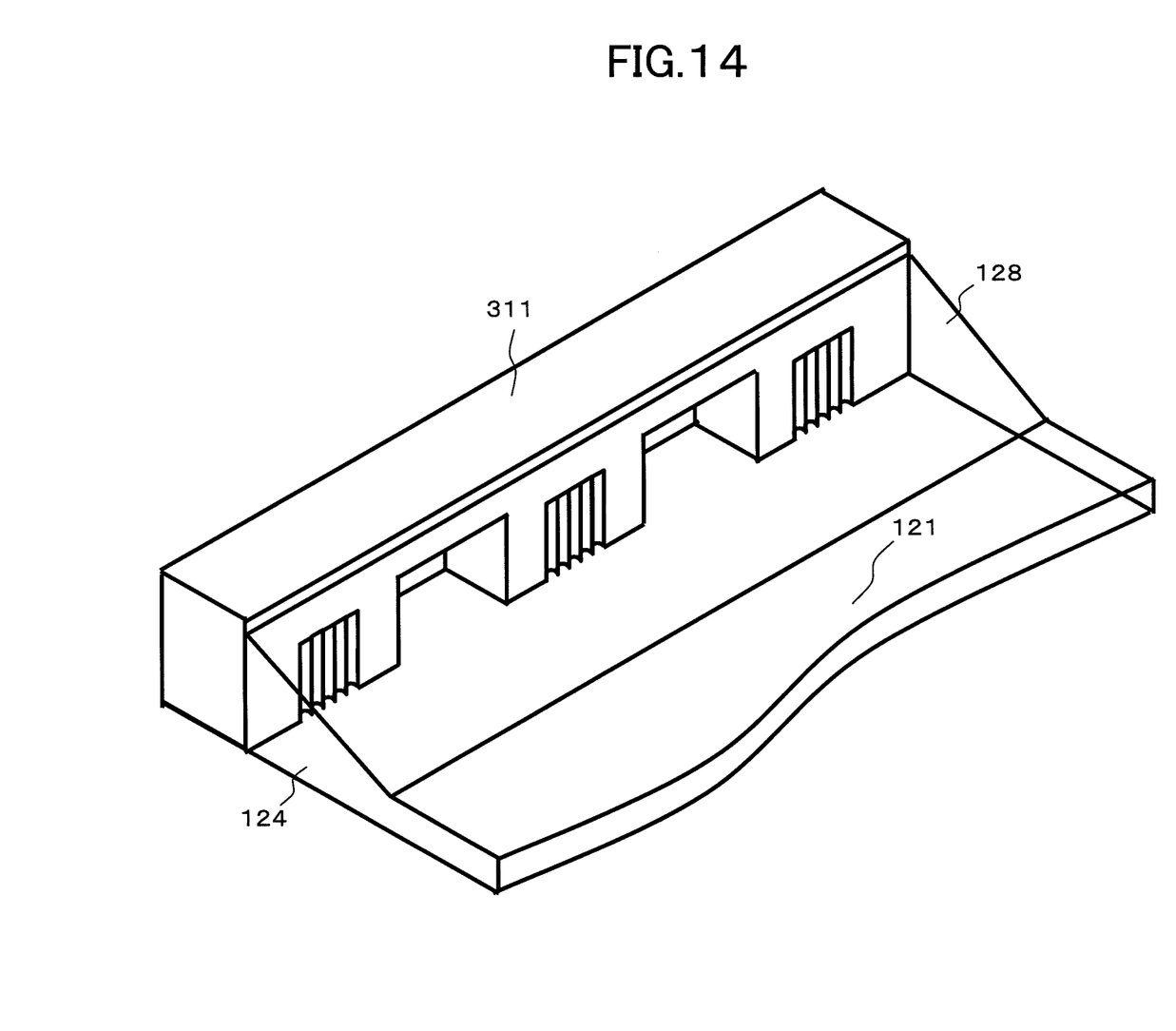
FIG. 14 is a schematic perspective view showing an area in the vicinity of a light incident portion of the light guide plate of the liquid crystal display device of the embodiment according to the present invention.

FIG. 14 is a partially enlarged view of the light incident portion 124. On the first side-surface portion 311, concaves and convexes for transferring shapes of the lenses 123 and the projecting portions 220 to the light guide plate 120 are formed. FIG. 14 is also a view showing an area of the light guide plate in the vicinity of the light incident portion 124 before the light incident portion 124 is compressed by the compression portion 351.

Figure 15:
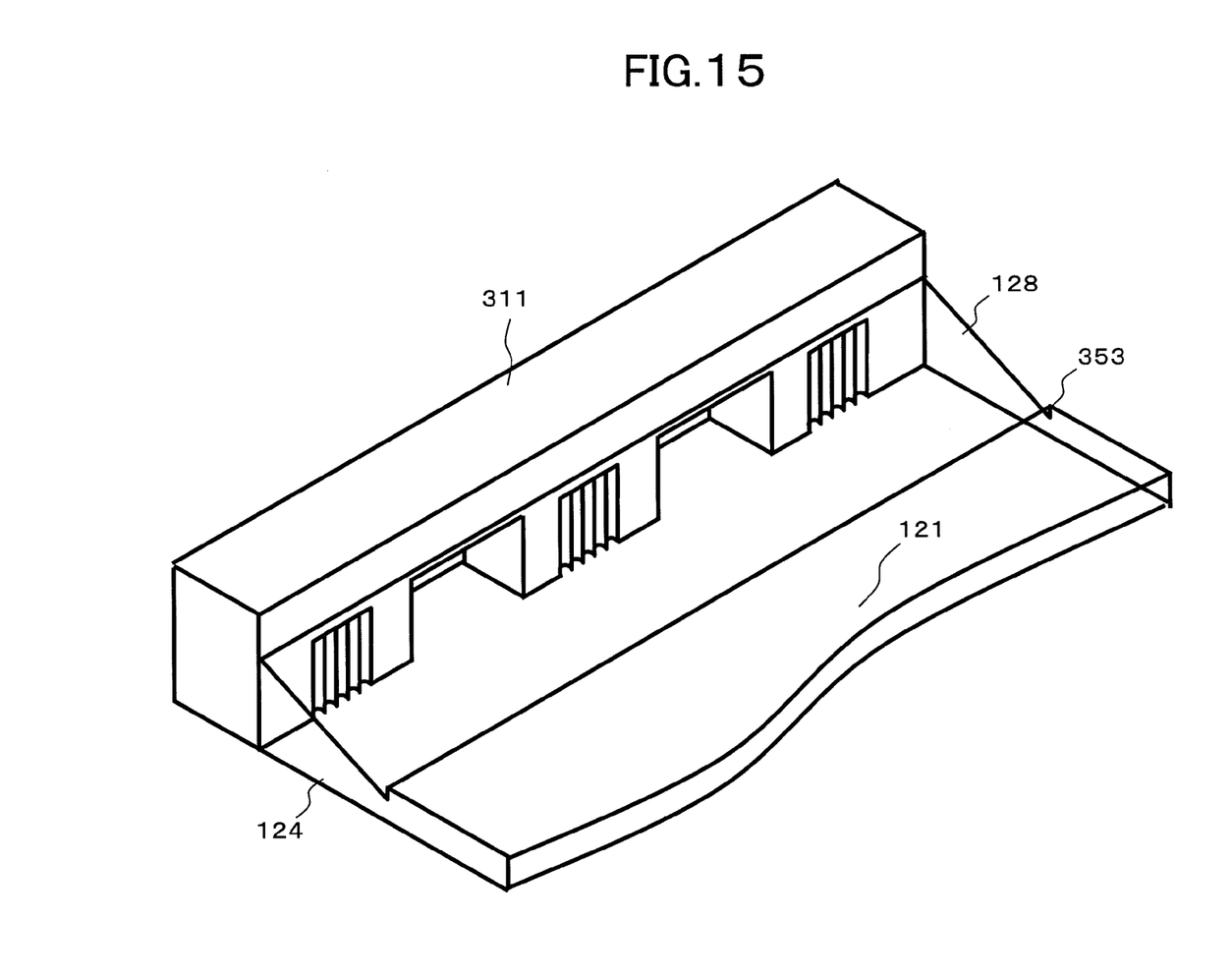
FIG. 15 is a schematic perspective view showing an area in the vicinity of a light incident portion of the light guide plate of the liquid crystal display device of the embodiment according to the present invention.

Before the light incident portion 124 is compressed, the inclined surface 128 and the upper surface 121 are connected with each other without a stepped portion therebetween. Next, FIG. 15 shows an area of the light guide plate 120 in the vicinity of the light incident portion 124 after the light incident portion 124 is compressed. After the light incident portion is compressed, the inclined surface 128 is pressed by the compression portion 351 and the upper surface 121 is not pressed and hence, the inclined surface 128 is downwardly pressed to a level below the upper surface 121 thus forming a stepped portion 353. For minimizing a loss of optical performance which the light guide plate 120 suffers, it is desirable to set a size of the stepped portion 353 to approximately 0.05 mm.

Figure 16:
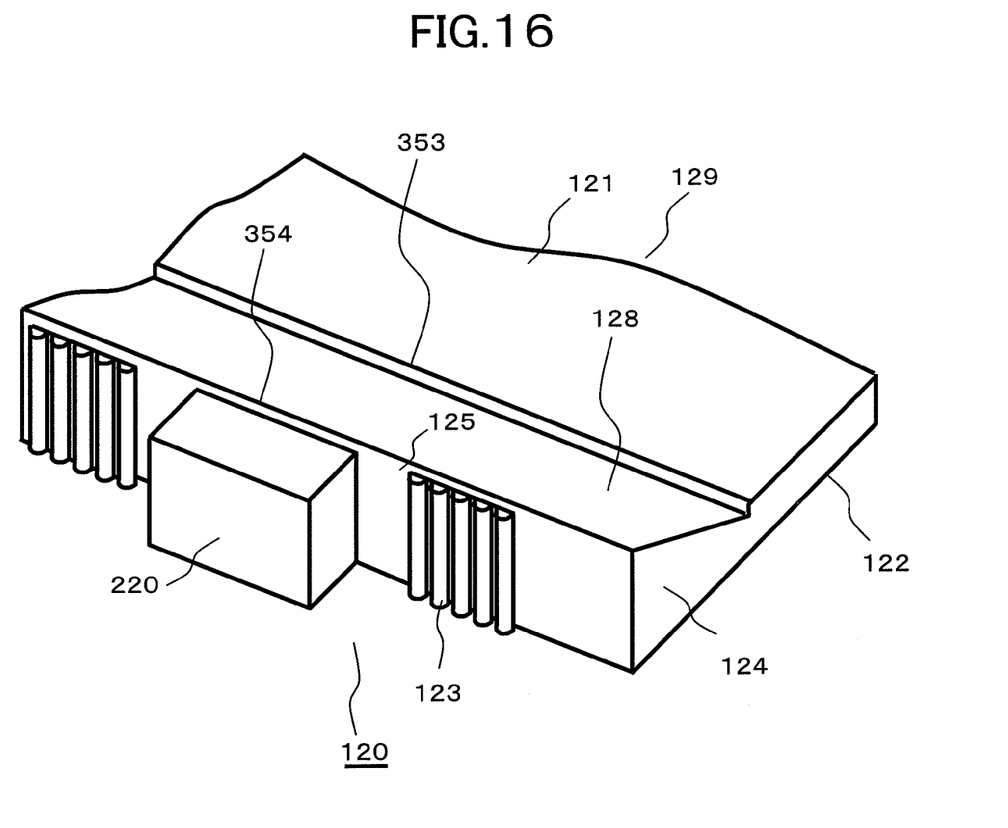
FIG. 16 is a schematic perspective view showing an area in the vicinity of a light incident portion of the light guide plate of the liquid crystal display device of the embodiment according to the present invention.

FIG. 16 is a partial perspective view of the light incident portion 124 as viewed from a light incident surface 125 side. The inclined surface 128 is downwardly pressed by compression, and the stepped portion 353 is formed between the inclined surface 128 and the upper surface 121. Further, on a light-incident-surface-125-side edge of the inclined surface 128, an upper end 354 of the inclined surface 128 is downwardly pressed and is formed so as to be arranged close to upper ends of the lenses 123 and the projecting portions 220. However, by forming the upper end 354 of the inclined surface 128 such that the upper end 354 of the inclined surface 128 is arranged above the upper ends of the lenses 123 and the projecting portions 220, it is possible to prevent leaking of light from the lenses 123.

That is, the upper end of the inclined surface 128 constitutes an upper end of the light incident surface 125 and hence, when the lenses 123 project from the light incident surface 125, light which is not incident on the light incident surface 125 from the lenses 123 is generated. To prevent the generation of such light, the upper end of the inclined surface is arranged above the upper ends of the lenses 123.

Figure 17:
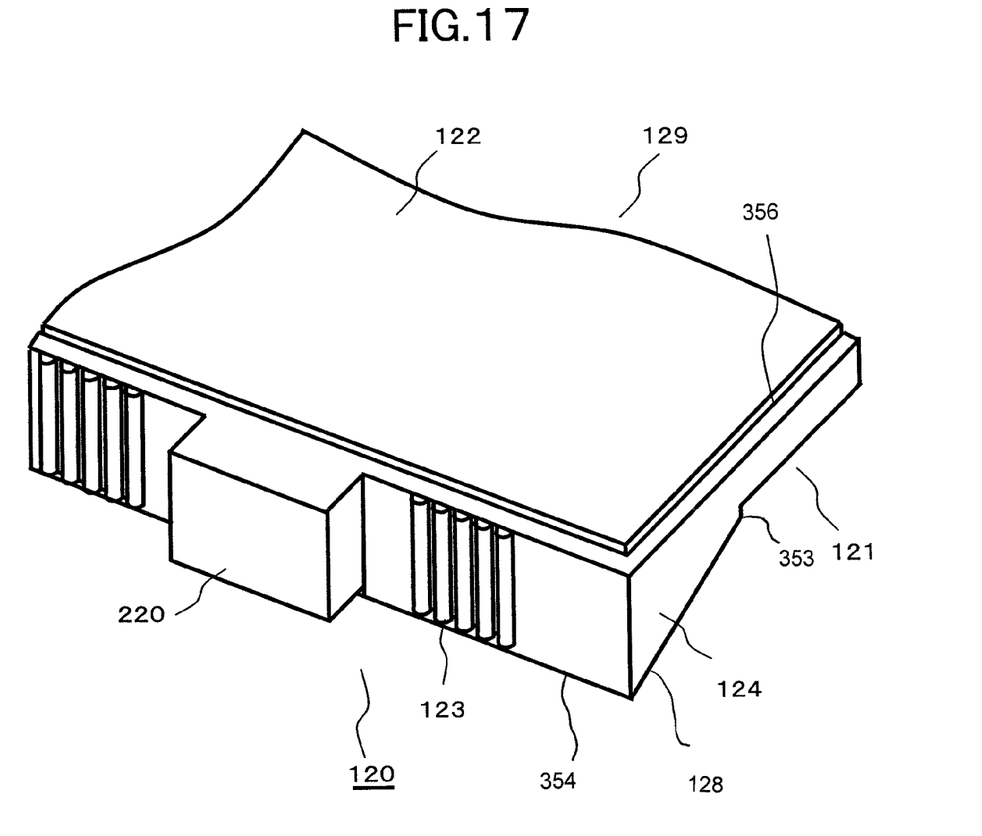
FIG. 17 is a schematic perspective view showing an area in the vicinity of a light incident portion of the light guide plate of the liquid crystal display device of the embodiment according to the present invention.

FIG. 17 is a perspective view of a lower-surface-122 side of the light guide plate 120. On the lower surface 122, a mark which is formed by the constraining portion by pressing remains in a form of a stepped portion 356, inclination or the like.

What is claimed is:

1. A liquid crystal display device comprising:
   a liquid crystal panel; and
   a backlight which radiates light to the liquid crystal panel, wherein
   the backlight includes a light emitting element and a light guide plate on which light emitted from the light emitting element is incident,
   the light guide plate includes a plurality of side surfaces including a light incident portion forming a side surface which faces a light emitting surface of the light emitting element in an opposed manner and on which the light emitted from the light emitting element is incident, a top surface including a light radiating portion which radiates the incident light, and a bottom surface,
   the light incident portion is formed by compressing a resin, and
   the light guide plate includes a stepped portion which is formed by compression, the stepped portion including a first stepped portion which is formed at the top surface between the light incident portion and the light radiation portion, and a second stepped portion which is formed at position only adjacent at least one of the plurality of side surfaces of the light guide plate between at least one end of the bottom surface and the at least one of the plurality of side surfaces.

2. A liquid crystal display device according to claim 1, wherein a thickness of a side surface of the light emitting element is set larger than a thickness of the light radiating portion of the light guide plate.

3. A liquid crystal display device according to claim 1, wherein lenses which diffuse light emitted from the light emitting element and allow the light to be incident on the light guide plate are mounted on the light incident portion.

4. A liquid crystal display device according to claim 1, wherein the second stepped portion is formed at the position only adjacent at least the side surface forming the light incident portion and another of the plurality of side surfaces of the light guide plate which is adjacent the side surface from the light incident portion.

5. A liquid crystal display device comprising:
   a liquid crystal panel; and
   a backlight which radiates light to the liquid crystal panel, wherein
   the backlight includes a light guide plate and a plurality of light emitting diodes which is arranged along a side surface of the light guide plate,
   the light guide plate includes a plurality of side surfaces including a light incident surface forming a side surface on which lenses on which light emitted from the light emitting diodes is incident are mounted, projecting portions which project from the side surface of the light guide plate with said each lens sandwiched therebetween, light top surface including radiating portion which has a thickness smaller than a length of the light emitting diodes, and a bottom surface,
   the light radiating portion includes a light radiating surface,
   a light incident portion is formed by forming the light incident surface and the projecting portions by injection molding,
   the light incident portion is formed by compressing a resin, and the light guide plate includes a stepped portion formed by compression, the stepped portion including a first stepped portion which is formed at the top surface between the light incident portion and the light radiation portion, and a second stepped portion which is formed at a portion only adjacent at least one of the plurality of side surfaces of the light guide plate between at least one end of the bottom surface and the at least one of the plurality of side surfaces.

6. A liquid crystal display device according to claim 5, wherein a thickness of the light emitting diode is set larger than a thickness of the light radiating portion of the light guide plate.

7. A liquid crystal display device according to claim 5, wherein the lens formed on the light incident surface is arranged between two neighboring projecting portions of the light guide plate.

8. A liquid crystal display device according to claim 5, wherein the light guide plate includes an inclined surface extending toward the light radiating surface from the light incident portion.

9. A liquid crystal display device according to claim 5, wherein the second stepped portion is formed at the position only adjacent at least the side surface forming the light incident surface and another side surface of the plurality of side surfaces of the light guide plate which is adjacent to the side surface forming the light incident surface.

10. A liquid crystal display device comprising;
a liquid crystal panel; and
a planar lighting device which radiates light to the liquid crystal panel, wherein
the planar lighting device includes a light guide plate and LEDs,
the light guide plate includes a top surface including a light radiating surface, a bottom surface which faces the light radiating surface in an opposed manner, and a plurality of side surfaces which intersect the light radiating surface and the bottom surface,
the LEDs are arranged along a side surface of the light guide plate,
light emitted from the LEDs is incident on the light guide plate at one of the plurality of side surfaces of the light guide plate, and
the light which is incident on the light guide plate is directed toward a light-radiating-surface-side by a diffusion member which is mounted on the bottom surface of the light guide plate and is radiated from the light radiating surface,
a thickness of the LED is set larger than a distance between the light radiating surface and the bottom surface,
the light guide plate includes an inclined portion between the one of the plurality of side surfaces on which light is incident and the light radiating surface,
the inclined portion is formed by compressing a resin, and
the light guide plate includes a stepped portion which is formed by compression, the stepped portion including a first stepped portion which is formed at the top surface between the one of the plurality of side surfaces on which the light is incident and the light radiation portion, and a second stepped portion which is formed at a position only adjacent at least one of the one and another of the plurality of side surfaces of the light guide plate between at least one end of the bottom surface and the at least one of the one and another of the plurality of side surfaces.

11. A liquid crystal display device according to claim 10, wherein columnar lenses are formed on the one of the plurality of side surfaces on which the light is incident.

12. A liquid crystal display device according to claim 10, wherein the first stepped portion is formed between the inclined portion and the light radiating surface.

13. A liquid crystal display device according to claim 10, wherein the second stepped portion is formed at the positions only adjacent at least the one and the another of the plurality of side surfaces of the light guide plate, the one and the another side surface of the plurality of side surfaces being adjacent side surfaces.

\* \* \* \* \*